United States Patent Office.

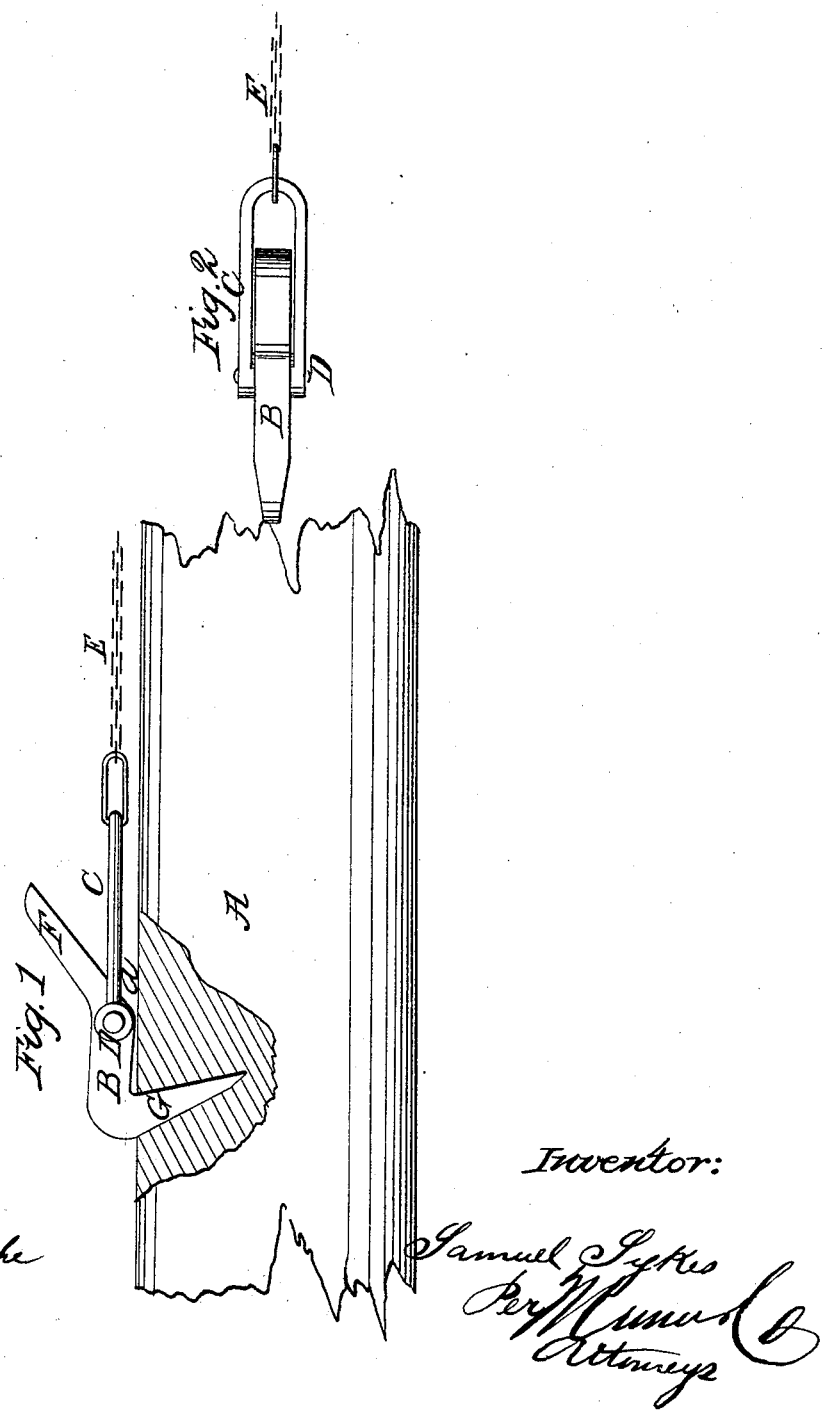

SAMUEL SYKES, OF CHIPPEWA FALLS, WISCONSIN.

Letters Patent No. 67,375, dated July 30, 1867.

IMPROVEMENT IN DOGS FOR SAW-LOGS.

The Schedule referred to in these Letters Patent and making part of the same.

TO ALL WHOM IT MAY CONCERN:

Be it known that I, SAMUEL SYKES, of Chippewa Falls, in the county of Chippewa, and State of Wisconsin, have invented a new and useful Improvement in Dogs for Drawing Saw-Logs; and I do hereby declare that the following is a full, clear, and exact description thereof, which will enable others skilled in the art to make and use the same, reference being had to the accompanying drawings, forming part of this specification.

This improvement relates to the manner in which the dog which is driven into a saw-log or other logs for the purpose of a "hold-fast" is formed, and the invention consists in elongating the common dog and turning up the elongated portion, whereby the dog is easily detached from the log.

Figure 1 represents a vertical longitudinal section of the dog with my improvement attached to a saw-log.

Figure 2 is a top or plan view of the same.

Similar letters of reference indicate like parts.

A represents the log; B is the dog with my improvement; C represents the device; D the eye and bolt by which the clevis is attached to the dog; E is the chain attached to the clevis to which the team is hitched. The dog in common use terminates where the clevis is attached, and in using it great difficulty is found in getting it out of the log unless a bar is at hand for the purpose. It has to be pried out, which is frequently a troublesome operation. My improvement is in adding the part marked F, which stands as represented in the drawing, when the dog is in the log. Now, to detach it in an instant with a mallet or lever, all that is necessary to be done is to strike the part F, which I have added, a smart blow, and the thing is done. F, with the horizontal part of the dog, forms a bent lever, whose fulcrum is at the point a, on the log, and a blow on the end of F has sufficient power to withdraw the bit of the dog at once. G represents the bit.

This simple device saves much valuable time in the handling of logs; and it will at once be understood and appreciated by all who are acquainted with the subject.

What I claim as new, and desire to secure by Letters Patent, is—

The part F, forming with the body of the dog a bent lever, as and for the purposes herein shown and described.

SAMUEL SYKES.

Witnesses:
C. J. WILTSE,
H. C. CORNELL.